United States Patent [19]

Namiki

[11] Patent Number: 4,549,231

[45] Date of Patent: Oct. 22, 1985

[54] SIGNAL REPRODUCING APPARATUS HAVING MEANS FOR MODIFYING A PRE-RECORDED CONTROL SIGNAL

[75] Inventor: Yasuomi Namiki, Yokohama, Japan

[73] Assignee: Victor Company of Japan, Ltd., Yokohama, Japan

[21] Appl. No.: 374,772

[22] Filed: May 4, 1982

[30] Foreign Application Priority Data

May 11, 1981 [JP] Japan .................. 56-70372
May 11, 1981 [JP] Japan .................. 56-70373

[51] Int. Cl.⁴ .................. G11B 27/02; H04N 5/78
[52] U.S. Cl. .................. 360/14.2; 360/33.1; 360/74.4
[58] Field of Search .................. 360/33.1, 73, 74.4, 360/14.2; 358/908, 335, 310

[56] References Cited

U.S. PATENT DOCUMENTS

| | | | |
|---|---|---|---|
| 3,350,511 | 10/1967 | Johnson | 360/73 |
| 3,636,252 | 1/1972 | Kowal | 360/14.2 |
| 3,646,260 | 2/1972 | Bolger | 360/14.2 |
| 3,684,825 | 8/1972 | Hurst | 360/14.2 X |
| 4,165,522 | 8/1979 | Moller | 360/73 |
| 4,283,735 | 8/1981 | Jaager | 358/908 X |
| 4,358,797 | 11/1982 | Nishijima et al. | 360/14.2 |
| 4,390,904 | 6/1983 | Johnston et al. | 360/33.1 X |

FOREIGN PATENT DOCUMENTS 2431988 2/1978 Fed. Rep. of Germany .

Primary Examiner—Aristotelis M. Psitos
Attorney, Agent, or Firm—Louis Bernat

[57] ABSTRACT

A signal recording and/or reproducing system is provided in a recording and/or reproducing apparatus having a control head for performing recording and/or reproduction of a control signal with respect to a control track on a tape, and a control circuit supplied and controlled by a reproduced control signal. The signal recording and/or reproducing system comprises a switching circuit for only passing signal parts in a signal reproduced by the control head which are required in the control circuit for control, a circuit for obtaining a signal which has passed through the switching circuit as a reproduced control signal and supplying this reproduced control signal to the control head, a modifying circuit for modifying signal parts recorded on the control track other than the signal parts required in the control circuit for control, and a discriminating circuit for discriminating signal parts within a reproduced signal obtained by reproducing the control track by the control head which are modified by the modifying circuit, to produce a discrimination signal.

10 Claims, 7 Drawing Figures

SIGNAL REPRODUCING APPARATUS HAVING MEANS FOR MODIFYING A PRE-RECORDED CONTROL SIGNAL

BACKGROUND OF THE INVENTION

The present invention generally relates to signal recording and/or reproducing systems, and more particularly to a signal recording and/or reproducing system in which a signal within a signal part recorded on a control track on a tape and reproduced to be used as a control signal is modified or a new signal is added within the above signal part in order to add another signal information, so that this other signal information can be utilized upon reproduction.

Generally, a broadcasted television program such as a movie, drama, and concert is recorded onto a cassette tape by use of a video signal magnetic recording and reproducing apparatus for home use (so-called video tape recorder, and hereinafter simply referred to as a VTR). These recorded television programs are collected to form a library of programs. When recording or reproducing the above television programs, the operator usually does not want to record or reproduce unwanted parts such as commercials which are broadcasted during these television programs.

If the operator of the VTR decides not to record the above unwanted part within the television program, the operator must monitor the picture screen of a television receiver and manipulate a pause-switch during an interval in which the unwanted part exists. When the pause-switch is manipulated, the tape travel is temporarily stopped to discontinue the recording. Accordingly, the unwanted part of the program is prevented from being recorded. When the desired program starts, the operator performs an operation to resume the recording operation. However, the above described operations are troublesome to perform. In addition, there was a disadvantage in that the operator must stay with the VTR and monitor the program during the recording.

When the above described operation to discontinue the recording operation selectively is not performed, or when a so-called timer recording is performed to record a desired program between two preset times, the above unwanted parts are unavoidably recorded onto the tape. Hence, if the above unwanted parts are to be eliminated after the recording, it is necessary to perform dubbing in order to edit the recorded program. Furthermore, the above unwanted parts are not solely introduced with respect to the broadcasted television programs. Even when a signal picked up by a television camera is recorded onto the tape by the VTR, the unwanted parts often appear when the signal is reproduced. In this case, the above dubbing must be performed to similarly edit the signal and eliminate the unwanted parts. However, it is troublesome and time consuming to perform dubbing in order to edit the program and the like. Moreover, there was a disadvantage in that expensive editing devices were required to perform the above editing.

In each of the above described conventional examples, the above unwanted program parts are not recorded on the magnetic tape which is finally obtained. Therefore, there was another disadvantage in that it was impossible to reproduce these unwanted program parts even when the need arises.

SUMMARY OF THE INVENTION

Accordingly, it is a general object of the present invention to provide a novel and useful signal recording and/or reproducing system in which the above described disadvantages have been overcome.

Another and more specific object of the present invention is to provide a signal recording and/or reproducing system in which a signal within a signal part recorded on a control track on a tape and reproduced to be used as a control signal is modified or a new signal is added within the above signal part in order to add another signal information, so that this other signal information can be utilized upon reproduction. According to the system of the present invention, the signal information is added by use of the control track which is conventionally used for the recording and reproduction of the control signal. Hence, it is unnecessary to provide an additional track and an additional head for recording and reproducing this additional track. Therefore, the tape utilization efficiency is high, and the construction of the recording and/or reproducing apparatus does not become complex.

Still another object of the present invention is to provide a signal recording and/or reproducing system in which parts other than signal parts within the normal control signal recorded upon recording of the video signal and used for control are modified, and the modified parts are used for performing an operation other than normal reproduction such as a fast-forward operation when the modified parts are reproduced.

Another object of the present invention is to provide a signal recording and/or reproducing system in which a fast-forward operation is performed with respect to the unwanted parts within the program recorded on the magnetic tape, to automatically perform an operation in which the unwanted parts are essentially not reproduced and only the desired parts of the program are reproduced, by reproducing the above modified signal parts. According to the system of the present invention, it is unnecessary to perform an operation to discontinue the recording upon recording or perform a dubbing operation to edit the program containing unwanted parts after the recording, as in the conventional case. In the system according to the present invention, the whole program is recorded, and a simple signal processing is performed after the recording to add a second control signal. Hence, the unwanted parts can essentially be skipped during reproduction.

Other objects and further features of the present invention will be apparent from the following detailed description when read in conjunction with the accompanying drawings.

DETAILED DESCRIPTION

Figure 1:
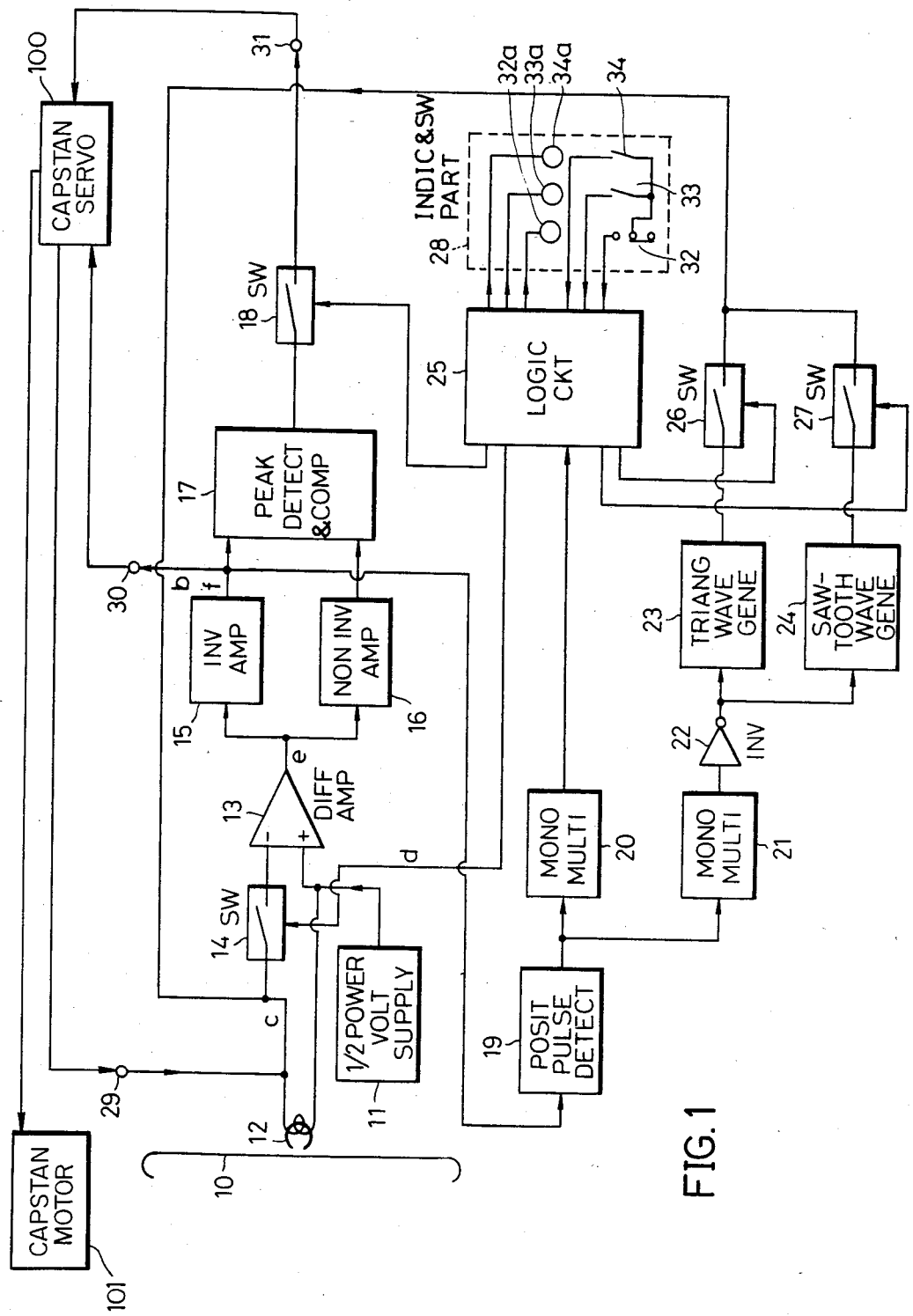
FIG. 1 is a systematic block diagram showing an embodiment of a signal recording and/or reproducing system according to the present invention.

In FIG. 1, an output terminal of a ½ power source voltage supplying circuit 11 is connected to one terminal of a control head 12 and also to a non-inverting input terminal of a differential amplifier 13. The control head 12 performs recording and reproduction of a control signal with respect to a control track on a magnetic tape 10. Another terminal of the control head 12 is connected to an input side of an electronic switch 14 and to output sides of electronic switches 26 and 27. The output side of the electronic switch 14 is connected to an inverting input terminal of the above differential amplifier 13. An output terminal of the differential amplifier 13 is connected to input terminals of an inverting amplifier 15 and a non-inverting amplifier 16. Output terminals of the inverting amplifier 15 and the non-inverting amplifier 16 are respectively connected to an input terminal of a peak detecting and comparing circuit 17. An output terminal of this peak detecting and comparing circuit 17 is connected to an input side of an electronic switch 18. The output terminal of the inverting amplifier 15 is also connected to a reproduced control signal output terminal 30 and to an input terminal of a positive pulse detector 19.

On the other hand, a logic circuit 25 has four electronic switch control signal output terminals. These output terminals are respectively connected to control signal input terminals of the electronic switches 14, 18, 26, and 27. An output terminal of the positive pulse detector 19 is connected to input terminals of a monostable multivibrator 20 for gating and a monostable multivibrator 21 for waveform generation. An output terminal of the monostable multivibrator 20 is connected to one input terminal of the above logic circuit 25. An output terminal of the monostable multivibrator 21 is connected to input terminals of a triangular wave generator 23 and a sawtooth wave generator 24, respectively, through an inverter 22. Output terminals of the triangular wave generator 23 and the sawtooth wave generator 24 are respectively connected to the input sides of the electronic switches 26 and 27. The above logic circuit 25 is connected to a indicator and switch part 28.

A recording control signal input terminal 29 is connected to the above other terminal of the control head 12. An output side of the electronic switch 18 is connected to a fast-forward control signal output terminal 31.

Figure 2:
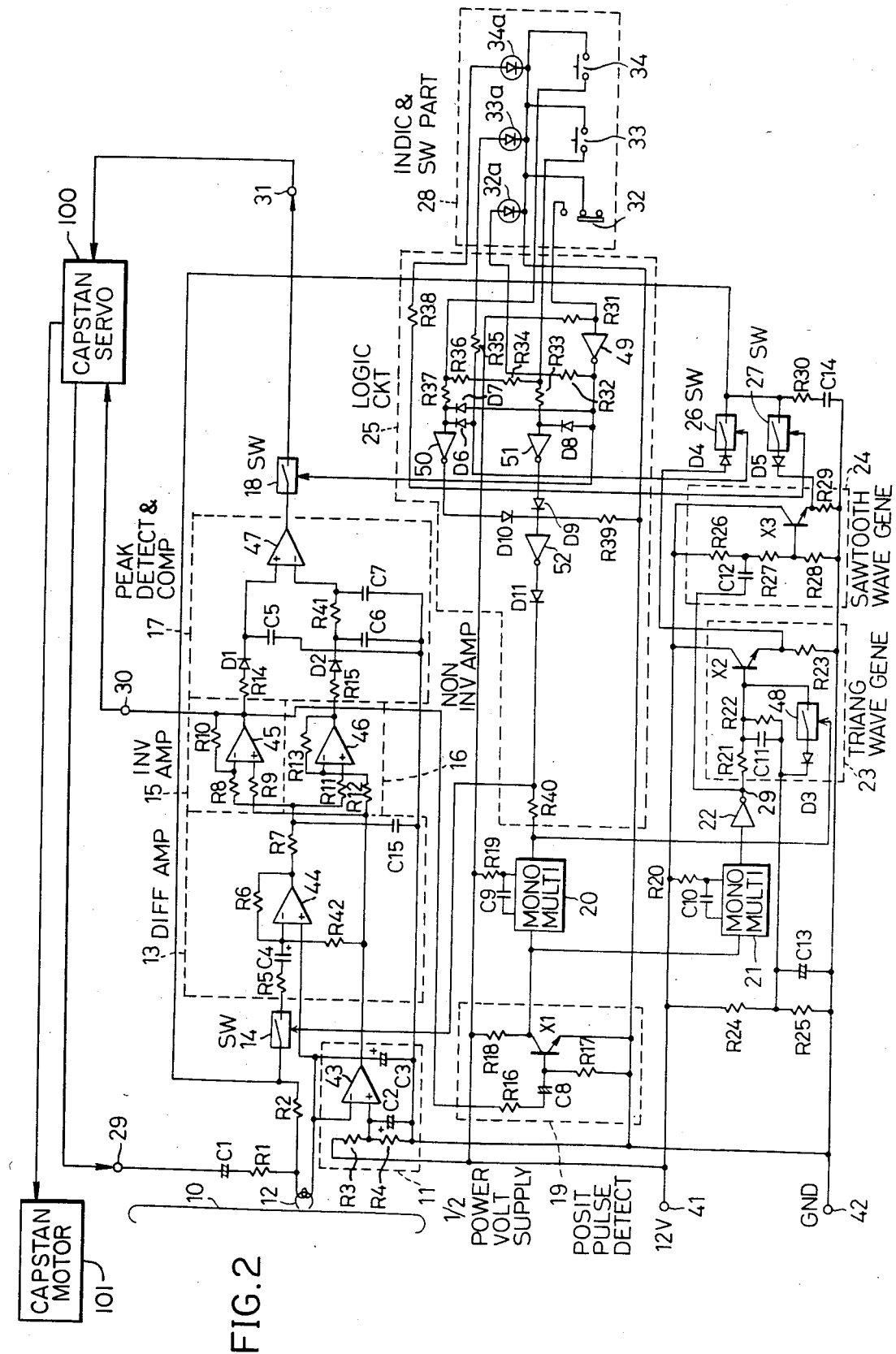
FIG. 2 is a circuit diagram showing a concrete circuit of the block system shown in FIG. 1.

An embodiment of a concrete circuit of the above block system is shown in FIG. 2. In FIG. 2, those parts which are the same as those corresponding parts in FIG. 1 are designated by the same reference numerals, and their description will be omitted. The ½ power source voltage supplying circuit 11 comprises a resistor R3 connected to a terminal 41 which is applied with a voltage of 12 volts, a resistor R4 connected to a ground terminal 42, capacitors C2 and C3, and an operational amplifier 43. The differential amplifier 13 comprises resistors R5 through R7, and R42, capacitors C4 and C15, and an operational amplifier 44. The inverting amplifier 15 comprises resistors R8 through R10, and an operational amplifier 45. The non-inverting amplifier 16 comprises resistors R11 through R13, and an operational amplifier 46. The peak detecting and comparing circuit 17 comprises resistors R14, R15, and R41, capacitors C5 through C7, diodes D1 and D2, and an operational amplifier 47. The positive pulse detector 19 comprises resistors R16 through R18, a capacitor C8, and a transistor X1. The triangular wave generator 23 comprises resistors R21 through R23, a capacitor C11, a diode D3, a transistor X2, and an electronic switch 48. The sawtooth wave generator 24 comprises resistors R26 through R29, a capacitor C12, and a transistor X3. The logic circuit 25 comprises resistors R31 through R40, diodes D6 through D11, and inverters 49 through 52.

Figure 3:
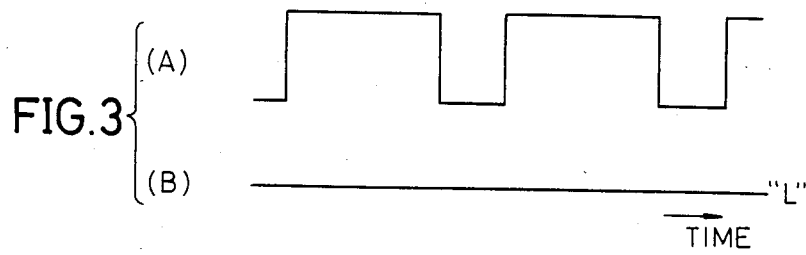
FIGS. 3(A) and 3(B) respectively show signal waveforms at each part of the block system shown in FIG. 1 during a control signal recording mode.

During a normal recording mode, a video signal recorded onto the magnetic tape 10 by rotary heads (not shown), and the circuits in FIGS. 1 and 2 are put into a control signal recording mode. A recording control signal indicated in FIG. 3(A) which is obtained from the terminal 29, is applied to the control head 12 through the capacitor C1 and the resistor R1, to record the control signal on a control track on the magnetic tape 10. The waveform of the above recording control signal is the same as that used conventionally. Since the other circuit system parts in FIGS. 1 and 2 are cut off from the power source except during a reproducing mode, the circuit system parts do not operate during the recording mode. Accordingly, an output signal from the terminal 30 remains at low level as indicated in FIG. 3(B).

Next, during a normal reproduction mode, the circuit system parts in FIGS. 1 and 2 are also put into a control signal reproducing mode. In this mode, switches 32, 33, and 34 in the indicator and switch part 28 are all in the OFF state, and indicator elements 32a, 33a, and 34a are not lit. The circuit operation is the same as in the conventional servo circuit during this mode.

The κ power source voltage supplying circuit 11 supplies a voltage of relatively low impedance, namely Vcc/2 which is ½ the power source voltage Vcc, to the terminal of the control head 12 which was conventionally grounded. Hence, the voltage applied to terminals of the capacitor C4 does not vary when the electronic switch 14 is turned ON or OFF. Thus, the switching noise can be reduced to a minimum.

Figure 4:
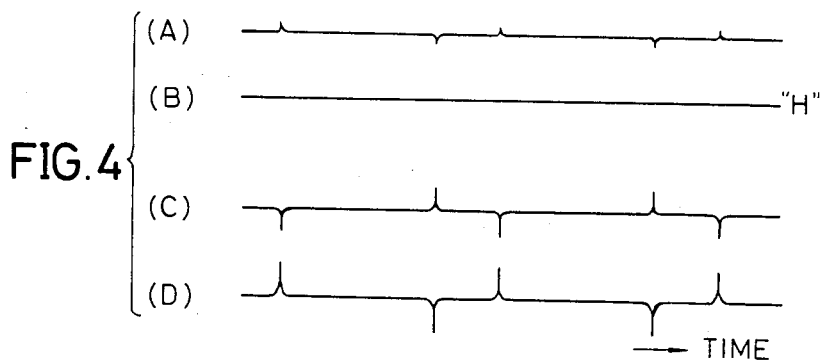
FIGS. 4(A) through 4(D) respectively show signal waveforms at each part of the block system shown in FIG. 1 during a normal reproduction mode, for explaining the control signal reproducing operation.

The control signal is reproduced from the control on the magnetic tape 10, by the control head 12. This reproduced control signal has a waveform indicated in FIG. 4(A), which can be obtained by differentiating the recording control signal indicated in FIG. 3(A). The reproduced control signal comprises positive (positive polarity) and negative (negative polarity) pulses respectively corresponding to the rise and fall in the waveform of the recording control signal. The electronic switch 14 is supplied with a switch control signal of high level indicated in FIG. 4(B) from the logic circuit 25, and is turned ON, that is, the electronic switch 14 is closed. The electronic switches 18, 26, and 27 are turned OFF. The above reproduced control signal is supplied to the differential amplifier 13 through the electronic switch 14. An output signal of the differential amplifier 13 having a waveform indicated in FIG. 4(C) is supplied to the inverting amplifier 15 wherein the phase of this output signal is inverted and the signal is amplified. Thus, a signal having a waveform indicated in FIG. 4(D) is obtained from the inverting amplifier 15. On the other hand, the output signal of the differential amplifier 13 is amplified without its phase being inverted, at the non-inverting amplifier 16. The above output signal of the inverting amplifier 15 is obtained as a reproduced control signal through the terminal 30. This reproduced control signal is supplied to a capstan servo circuit 100 which controls a capstan motor 101 and used as a control signal. In this case, positive and negative pulses such as those indicated in FIG. 4(D) are supplied to the servo circuit, however, only the positive pulses are actually used in the servo circuit in order to perform the control operation.

Because the electronic switches 18, 26, and 27 are turned OFF (opened) by the logic circuit 25, a signal is not obtained from the terminal 31. Thus, a signal is not supplied to the control head 12 through the electronic switches 26 and 27.

Next, description will be given with respect to a modifying mode in which a part of the control signal recorded on the control track on the magnetic tape 10 is modified in accordance with an unwanted program signal part which essentially does not need to be reproduced.

Figure 5:
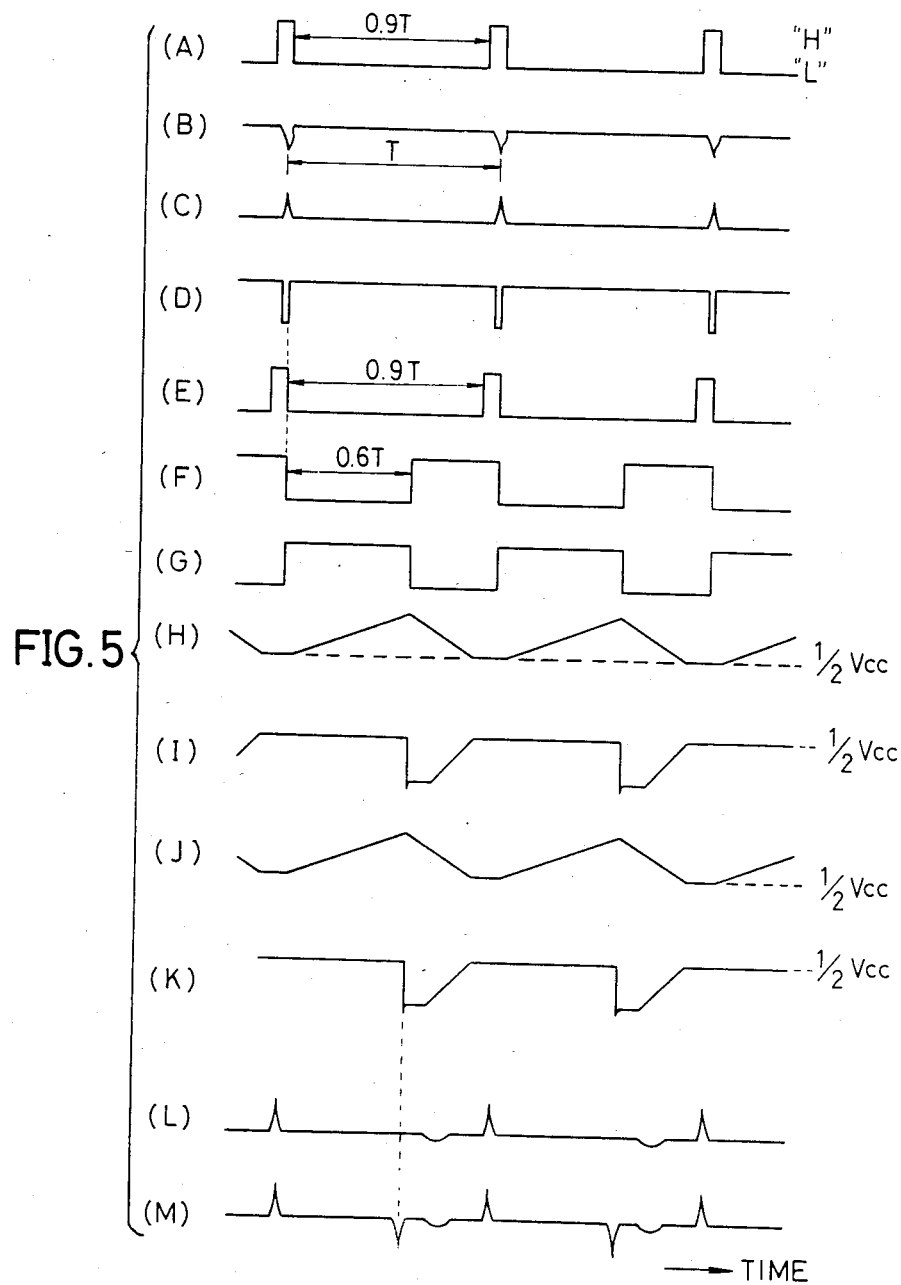
FIGS. 5(A) through 5(M) respectively show signal waveforms at each part of the block system shown in FIG. 1, for explaining an operation in which the control signal is reproduced and a part of the control signal is modified through signal processing, and an operation in which the modified signal part is restored to the original signal.

During this mode, the switches 32 and 34 in the indicator and switch part 28 remain in the OFF state, and the switch 33 is turned ON. This switch 33 is maintained in the ON state for the duration of the above unwanted program signal part. Hence, among the indicator elements 32a through 34a comprising light-emitting diodes, only the indicator element 33a is lit to indicate that the system is in a control signal modifying mode. A switch control signal indicated in FIG. 5(A) is applied to the electronic switch 14 from the logic circuit 25, and the electronic switch 14 is turned ON during the high-level period of the switch control signal and turned OFF during the low-level period of the switch control signal. Accordingly, if the time interval of the control signal is designated by T, the electronic switch 14 is turned ON during the interval of 0.1T in which the positive pulse exists, and turned OFF during an interval of approximately 0.9T thereafter. Therefore, only the positive pulses in the control signal reproduced by the control head 12 passes through the electronic switch 14. Hence, an output indicated in FIG. 5(B) is obtained from the differential amplifier 13, and an output indicated in FIG. 5(C) is obtained from the inverting amplifier 15.

The output reproduced control signal of the inverting amplifier 15 is obtained through the terminal 30, and supplied to the capstan servo circuit 100 to control the operation of the capstan servo circuit 100. In this case, the negative pulses such as those in the reproduced control signal indicated in FIG. 4(D) is not supplied to the capstan servo circuit 100. However, no problems are introduced, since only the positive pulses in the reproduced control signal contribute to the servo control operation, and the negative pulses do not contribute to the servo control operation.

In the differential amplifier 13 shown in FIG. 2, the resistor R7 and the capacitor C15 construct a lowpass filter. This lowpass filter acts to reduce the pulse noise such as switching noise which is generated when the electronic switch 14 is opened and closed.

The reproduced control signal from the inverting amplifier 15 which has the waveform indicated in FIG. 5(C), is also supplied to the positive pulse detector 19. Because this reproduced control signal solely consists of positive pulses, detection is accordingly performed. A detected outut indicated in FIG. 5(D) is obtained from the positive pulse detector 19. The output signal of the detector 19 is supplied to the monostable multivibrator 20 for gating. A gating signal obtained from the monostable multivibrator 20 having a waveform indicated in FIG. 5(E), is supplied to the logic circuit 25. As indicated in FIG. 5(E), the output signal of the monostable multivibrator 20 becomes of low level in response to a rise in the output signal of the detector 19, and this low level is maintained for an interval (0.9T) determined by a time constant obtained from the capacitor C9 and the resistor R19. Because the output of the monostable multivibrator 20 is supplied to the logic circuit 25 as a gating signal, the above switch control signal indicated in FIG. 5(A) is supplied to the electronic switch 14 from the logic circuit 25.

On the other hand, the output signal of the detector 19 is also supplied to the monostable multivibrator 21 for waveform generation. An output having a waveform indicated in FIG. 5(F) is accordingly obtained from the monostable multivibrator 21. The time constant of the interval during which the above output signal is of low level, is approximately 0.6T. This output is inverted at the inverter 22, and supplied to the triangular wave generator 23 and the sawtooth wave generator 24, as a signal having a waveform indicated in FIG. 5(G). A triangular wave having a waveform indicated in FIG. 5(H) in which the lower end of the waveform is ½ the power source voltage, is generated by operations of a ½ power source voltage generating part constructed from the resistors R24 and R25 and the capacitor 13, and an integrating circuit constructed from the resistors R21 and R22 and the capacitor C11 within the triangular wave generator 23. This triangular wave is obtained after being subjected to impedance conversion at the transistor X2. In the triangular wave generator 23, a circuit comprising the diode D3 and the electronic switch 48 forcibly restricts the voltage so that a voltage over ½ the power source voltage is not supplied to the electronic switch 26 when the electronic switch 14 is in the ON state, due to errors in the circuit time constant, temperature variation, variation with respect to time, and the like. This circuit may be omitted.

During this signal modifying mode, the electronic switch 26 is turned ON while the electronic switches 27 and 18 are turned OFF, by the switch control signals from the logic circuit 25. Accordingly, the triangular wave indicated in FIG. 5(H) which is obtained from the triangular wave generator 23, is applied to the control head 12 through the electronic switch 26. Because the electronic switch 27 is turned OFF, a signal applied to the control head 12 has a triangular waveform as the signal indicated in FIG. 5(H), as indicated in FIG. 5(J). When this signal indicated in FIG. 5(J) is applied to the control head 12, parts in the control signal recorded on the control track on the tape 10 corresponding to parts other than the positive pulses are subjected to DC-erasure. Hence, the negative pulses are erased, and as a result, the control signal is modified. When the interval in which the signal having the waveform indicated in FIG. 5(J) is applied to the control head 12 to erase the negative pulses and modify the control signal as described above is reproduced again in a latter mode, a signal having a waveform indicated in FIG. 5(L) is accordingly reproduced. The negative pulses do not exist during this interval. The triangular wave is used to erase the negative pulses, so that the pulse noise do not remain due to the rapid change in the waveform. The triangular wave is suited for the erasing of the negative pulses, since the level of the triangular wave gradually changes and does not comprise rapidly changing parts.

The above described operation is performed during an interval in which an unwanted part (a commercial, for example) which essentially do not need to be reproduced exists within the program recorded onto the tape 10. During this interval, a part of the control signal recorded on the control track on the tape corresponding to the part which essentially do not need to be reproduced is modified, and the negative pulses are accordingly erased and eliminated.

The logic circuit 25 shown in FIG. 2 is constructed so that, when the switch 34 is erroneously turned ON together with the switch 33, the switch 33 has priority over the switch 34 and only the switch 33 is turned ON.

Next, description will be given with respect to the operation during a reproducing mode in which the above processed signal is reproduced from the tape 10. During this mode, the switch 32 in the indicator and switch part 28 is turned ON, and the switches 33 and 34 are turned OFF. In this state, the indicator element 32a is lit to indicate that the system is in a partially omitting reproducing mode. Furthermore, the electronic switches 14 and 18 are turned ON and the electronic switches 26 and 27 are turned OFF, by the switch control signals from the logic circuit 25. The signal reproduced by the control head 12 is supplied to the differential amplifier 13 through the electronic switch 14.

Figure 6:
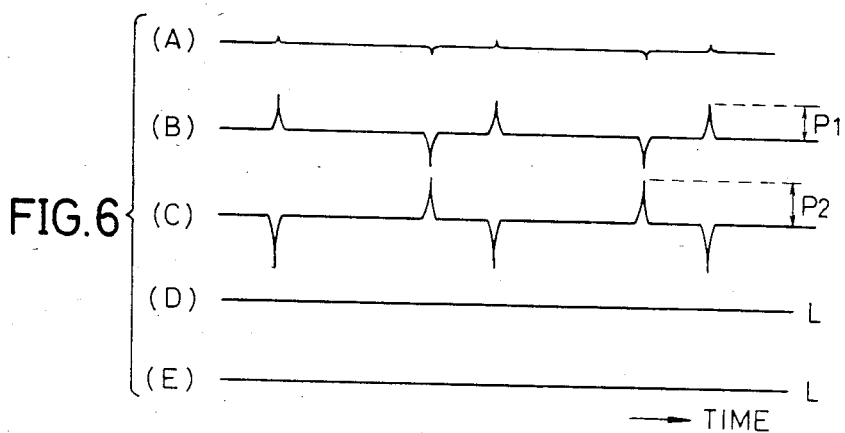
FIGS. 6(A) through 6(E) respectively show signal waveforms at each part of the block system shown in FIG. 1, for explaining the control signal reproducing operation during a normal reproduction mode.

When reproduction is performed with respect to the part which is not subjected to the above signal modification, a control signal indicated in FIG. 6(A) comprising positive and negative pulses is reproduced by the control head 12. The signal indicated in FIG. 6(A) is the same as the signal indicated in FIG. 4(A). Signals having waveforms respectively indicated in FIGS. 6(B) and 6(C), are respectively obtained from the inverting amplifier 15 and the non-inverting amplifier 16. The gain (amplification) of the non-inverting amplifier 16 is set to a value larger than the gain (amplification) of the inverting amplifier 15. Thus, an amplitude P1 of the output signal of the inverting amplifier 15 is smaller than an amplitude P2 of the output signal of the non-inverting amplifier 16. Accordingly, the output of the peak detecting and comparing circuit 17 which detects and compares the peaks of the output signals supplied from the amplifiers 15 and 16, remains at low level as indicated in FIG. 6(D). The signal at the terminal 31 thus remains at low level as indicated in FIG. 6(E). Therefore, the VTR continues to be in the normal reproduction mode.

Figure 7:
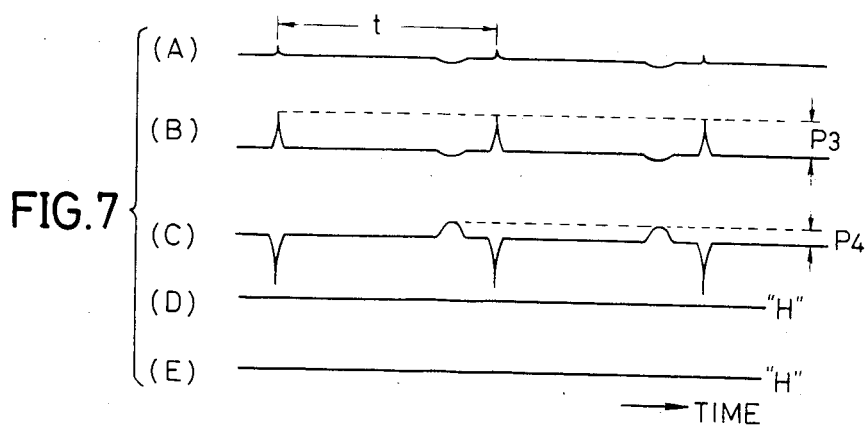
FIGS. 7(A) through 7(E) respectively show signal waveforms at each part of the block system shown in FIG. 1, for explaining the reproducing operation with respect to the modified signal part.

Next, when the signal part which is modified in the above described manner is reproduced, the signal reproduced by the control head 12 has a waveform indicated in FIG. 7(A). As seen in FIG. 7(A), the negative pulses are eliminated and only the positive pulses exist in this signal. Accordingly, the output signal of the inverting amplifier 15 becomes as indicated in FIG. 7(B), comprising only the positive pulses and having an amplitude P3. On the other hand, the output signal of the non-inverting amplifier 16 becomes as indicated in FIG. 7(C). This output signal of the non-inverting amplifier 16 does not have any positive pulses, except for parts which correspond to traces of the above eliminated negative pulses and having an amplitude P4. Hence, between the signals supplied to the peak detecting and comparing circuit 17, the amplitude P3 of the output signal of the inverting amplifier 15 is larger than the amplitude P4 of the output signal of the non-inverting amplifier 16. The output signal of the peak detecting and comparing circuit 17 thus becomes of high level as indicated in FIG. 7(D). Therefore, the high-level signal indicated in FIG. 7(E) is supplied to the terminal 31 through the electronic switch 18 which is in the ON state, and this high-level signal is then supplied to a circuit in a succeeding stage of the VTR as a fast-forward control signal.

By the known construction of the VTR, the VTR is put into the fast-forward mode, and the speed of the tape travel is increased to twenty times the tape speed upon normal reproduction, for example. During this fast-forward mode, it only takes about ten seconds to forward the tape which usually takes three minutes to reproduce upon normal reproduction. Hence, the modified signal part corresponding to the unwanted signal part which does not need to be reproduced is essentially not reproduced, and this part is passed within an exceedingly short period of time. When a part which is not subjected to the signal modification is reached, that is, when the control signal indicated in FIG. 6(A) is reproduced, the VTR again returns to the normal reproduction mode.

During the above fast-forward mode, a time interval t of the reproduced positive pulses becomes small and the frequency of the reproduced positive pulses becomes high, since the tape speed is increased. The amplitudes P3 and P4 accordingly increase, however, the above fast-forward mode is maintained until a negative pulse is reproduced, because the relation P3>P4 does not change. Muting may be performed with respect to the reproducing systems for the video signal and the audio signal by using the signal obtained from the terminal 31, during the above fast-forward mode.

In a state where the above mode is obtained by turning the switch 32 ON, the logic circuit 25 shown in FIG. 2 is constructed so that this state is maintained regardless of whether one or both the other switches 33 and 34 are erroneously turned ON.

There are cases where the above described signal modification is performed with respect to the part of the control signal corresponding to the part which was originally considered as having no need to be reproduced, and the operator of the VTR later decides to reproduce this part. In such a case, the modified signal part is restored to its original state by performing the following operations. For this mode, the switches 32 and 33 are turned OFF and the switch 34 is turned ON. By these operations, the indicator element 34a is lit to indicate that the system is in a signal restoring mode. Moreover, the electronic switches 18 and 26 are turned OFF and the electronic switch 27 is turned ON by the switch control signals from the logic circuit 25. The electronic switch 14 is applied with the same gate control signal indicated in FIG. 5(A) as in the above described signal modifying mode. Thus, the electronic switch 14 is turned ON during a short interval including the positive pulse, and is turned OFF during other intervals. The relationship between the ON and OFF states of the electronic switches 26 and 27, is reversed during the above signal modifying mode and the signal restoring mode.

Similarly as in the above signal modifying mode, the output of the monostable multivibrator 21 having the waveform indicated in FIG. 5(F), is supplied to the triangular wave generator 23 and the sawtooth wave generator 24 through the inverter 22, as a signal having the waveform indicated in FIG. 5(G). Because the electronic switch 26 is in the OFF state, the output of the triangular wave generator 23 is not supplied to the control head 12.

On the other hand, a sawtooth wave indicated in FIG. 5(I) is obtained from the sawtooth wave generator 24, and this sawtooth wave is applied to the control head 12 through the electronic switch 27, as a signal having a waveform indicated in FIG. 5(K). As clearly seen from FIG. 2, this sawtooth wave generator 24 is basically a differential circuit. By the function of the diode D5 connected between the sawtooth wave generator 24 and the electronic switch 27 in the reverse direction, the negative pulse parts lower than ½ the power source voltage are accordingly obtained.

Because the rise in the above sawtooth wave is sharp, the negative pulses are generated and then recorded onto the control track on the tape 10 by the control head 12. Hence, negative pulses indicated in FIG. 5(M) are additionally recorded onto a signal indicated in FIG. 5(L) which is subjected to signal modification and the negative pulses are eliminated, to restore and obtain the original control signal. In the present embodiment of the invention, the negative pulses are restored at positions avoiding the positions where the negative pulses originally existed and traces of the eliminated negative pulses exist. Accordingly, when normal reproduction is afterwards performed with respect to such restored part, normal reproduction is correctly performed without putting the system into a fast-forward mode. Hence, unlike in the case where unwanted part is cut and edited, it is possible to again reproduce the part which was originally considered as having no need to be reproduced. By performing the above described signal modification process and the signal restoring process, it becomes possible to arbitrarily and essentially not reproduce the unwanted signal part and reproduce the unwanted part when the need arises.

A circuit such as the circuit comprising the diode D3 and the electronic switch 48, can similarly be provided in the sawtooth wave generator 24 as in the case of the triangular wave generator 23. However, in the present embodiment of the invention, such a circuit has been omitted in the sawtooth wave generator 24.

In the above described embodiment, discrimination between normally reproducing part and fast-forwarding part is performed by the existence or non-existence of the negative pulses. However, the method of discrimination is not limited to this method. For example, the above discrimination may be performed according to the number of existing negative pulses, or by varying the position of the negative pulses. Furthermore, instead of inserting a fast-forward mode information signal in the signal parts other than the signal parts where the positive pulses exist, a cue signal may be inserted to put the system into other operational modes. Other information signal such as a signal indicating the date may be inserted. The principle concept of the present invention is to utilize signal parts other than the signal parts originally used for control within the control track, for recording and reproduction of other information signals.

Further, the present invention is not limited to these embodiments, but various variations and modifications may be made without departing from the scope of the present invention.

What is claimed is:
1. A signal reproducing apparatus which comprises:
a control head for recording and reproducing a control signal recorded in a control track on a tape;
control circuit means for controlling functions of said reproducing apparatus in response to a pre-recorded control signal which is reproduced from the tape by said control head, said pre-recorded control signal being made up of first and second signal parts comprising positive and negative pulses, said first signal parts being only said positive pulses;
switch means coupled to said control head for passing only said first signal parts of the pre-recorded control signal which is reproduced by said control head during a signal modifying mode, said first signal parts being essential to the operation of said control circuit means;
means for obtaining a signal which has passed through said switch means as a reproduced control signal and for supplying the reproduced control signal to said control circuit means;
modifying means coupled to said signal obtaining means for modifying said second signal parts of the pre-recorded control signal which is reproduced by said control head and for supplying the modified second signal parts to said control head, said second signal parts not being essential to the operation of said control circuit means, said modifying means comprising means for forming triangular waves within intervals other than intervals in which said positive pulses exist, means for applying said triangular waves to said control head, said control head responding to said triangular waves by erasing signal parts corresponding to said negative pulses on said control track;
means for intermittently placing said control head in reproducing and recording states during the signal modifying mode in order to record the modified second signal parts received from said modifying means in place of the second signal parts of said pre-recorded control signal;
restoring means comprising means for generating sawtooth waves having parts with steep level change; and
means for applying the generated sawtooth waves to said control head, and said control head supplied with said sawtooth waves recording negative pulses onto said control track in response to parts of said sawtooth waves having steep level change.
2. A signal reproducing apparatus comprising:
setting means for manually setting the mode of the reproducing apparatus to one of a plurality of modes, said plurality of modes at least including a normal reproduction mode and a control signal modifying mode;
logic circuit means responsive to a predetermined signal and to an output signal of said setting means corresponding to the set mode for producing switching control signals;
a control head for recording and reproducing a control signal on and from a control track of a tape;

control circuit means for controlling functions of the reproducing apparatus in response to a pre-recorded control signal which is reproduced from the tape by said control head, said pre-recorded control signal being made up of first and second signal parts in terms of waveform thereof, said first signal parts being essential to the operation of said control circuit means, said second signal parts being not essential to the operation of said control circuit means;

switch means responsive to an output switching control signal of said logic circuit means, said switch means passing both the first and second signal parts of the pre-recorded control signal which is reproduced by said control head during the normal reproduction mode and passing only the first signal parts of the pre-recorded control signal which is reproduced by said control head during the control signal modifying mode;

signal obtaining means for obtaining a signal which has passed through said switch means as a reproduced control signal and for supplying the reproduced control signal to said control circuit means;

modifying means responsive to an output switching control signal of said logic circuit means for supplying modifying signal parts to said control head causing waveform modifications of said pre-recorded control signal on the tape during the control signal modifying mode in time periods other than the time period of said first signal parts of the pre-recorded control signal which is reproduced by said control head so that said control head records said modifying signal parts and modifies said second signal parts of the pre-recorded control signal, said modifying means being coupled to said signal obtaining means and supplying said predetermined signal to said logic circuit means.

3. A signal reproducing apparatus as claimed in claim 2 in which said pre-recorded control signal which is reproduced by said control head comprises positive and negative pulses, said first signal parts being only one of said positive pulses or said negative pulses, and said modifying means erasing the other of said positive pulses or said negative pulses.

4. A signal reproducing apparatus as claimed in claim 3 in which said first signal parts are positive pulses, said modifying means comprising means for forming triangular waves within intervals other than intervals in which said positive pulses exist, and means for applying said triangular waves to said control head, and said control head responding to said triangular waves by erasing signal parts corresponding to said negative pulses on said control track.

5. A signal reproducing apparatus as claimed in claim 3 in which said plurality of modes include a signal restoring mode, and said reproducing apparatus further comprises restoring means responsive to an output switching control signal of said logic circuit means for recording said other pulses which have been previously erased by said modifying means in order to restore the erased pulses into their original states during the signal restoring mode.

6. A signal reproducing apparatus as claimed in claim 2 in which said plurality of modes include a signal restoring mode, and said reproducing apparatus further comprises restoring means responsive to an output switching control signal of said logic circuit means for restoring signal parts which have been previously modified by said modifying means back into their original states during the signal restoring mode.

7. A signal reproducing apparatus as claimed in claim 2 in which said signal which is reproduced by said control head comprises positive and negative pulses, said first signal parts being only one of said positive pulses or said negative pulses, and said modifying means varying the position of the other of said positive pulses or said negative pulses.

8. A signal reproducing apparatus as claimed in claim 2 in which said signal which is reproduced by said control head comprises positive and negative pulses, said first signal parts being only one of said positive pulses or said negative pulses, and said modifying means varies the number of the other of said positive pulses or said negative pulses.

9. A signal reproducing apparatus as claimed in claim 2 in which said plurality of modes include a partially omitting reproducing mode, and said reproducing apparatus further comprises discrimination means responsive to an output switching control signal of said logic circuit means for discriminating modified signal parts in the signal which has passed through said switch means during the partially omitting reproducing mode, said discrimination means supplying a discrimination signal to said control circuit means when the modified signal parts are discriminated.

10. A signal reproducing apparatus as claimed in claim 9 in which said discrimination signal comprises a tape fast-forwarding signal for putting said reproducing apparatus into a tape fast-forward mode.

* * * * *